US011308412B2

(12) United States Patent
Morimura

(10) Patent No.: US 11,308,412 B2
(45) Date of Patent: Apr. 19, 2022

(54) ESTIMATION OF SIMILARITY OF ITEMS

(71) Applicant: INTERNATIONAL BUSINESS MACHINES CORPORATION, Armonk, NY (US)

(72) Inventor: Tetsuro Morimura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 781 days.

(21) Appl. No.: 15/487,671

(22) Filed: Apr. 14, 2017

(65) Prior Publication Data
US 2018/0300643 A1    Oct. 18, 2018

(51) Int. Cl.
*G06N 7/00* (2006.01)
*G06Q 30/02* (2012.01)

(52) U.S. Cl.
CPC ......... *G06N 7/005* (2013.01); *G06Q 30/0202* (2013.01)

(58) Field of Classification Search
CPC ........................... G06N 7/005; G06Q 30/0202
See application file for complete search history.

(56) References Cited

U.S. PATENT DOCUMENTS

| 8,160,984 B2 | 4/2012 | Hunt et al. | |
| 10,789,257 B2 * | 9/2020 | Dhollander | G06F 16/24578 |
| 2014/0278768 A1 * | 9/2014 | Zenor | G06Q 30/0202 |
| | | | 705/7.31 |
| 2015/0058087 A1 * | 2/2015 | Kulagin | G06Q 30/0204 |
| | | | 705/7.34 |
| 2015/0127431 A1 * | 5/2015 | Thomas | G06F 16/217 |
| | | | 705/7.39 |
| 2016/0125500 A1 | 5/2016 | Wang et al. | |
| 2016/0232637 A1 | 8/2016 | Motohashi et al. | |
| 2018/0042541 A1 * | 2/2018 | Barbour | A61B 5/163 |

OTHER PUBLICATIONS

Aaron C. Courville, Nathaniel D. Daw, David S. Touretzky, "Similarity and discrimination in classical conditioning: A latent variable account", NIPS, 2004 (Year: 2004).*
Mengwen Xu, Tianyi Wang, Zhengwei Wu, Jingbo Zhou, Jian Li, Haishan Wu, "Demand Driven Store Site Selection via Multiple Spatial-temporal Data", SIGSPATIAL'16, Oct. 31-Nov. 3, 2016, Burlingame, CA, USA, pp. 1-20 (Year: 2016).*
Wang Kay Ngai, Ben Kao, Chun Kit Chui, Reynold Cheng, Michael Chau, Kevin Y. Yip, "Efficient Clustering of Uncertain Data", ICDM'06, IEEE, pp. 1-10, 2006 (Year: 2006).*
Bin Jiang, Jian Pei, Yufei Tao, Xuemin Lin, "Clustering Uncertain Data Based on Probability Distribution Similarity", IEE transaction on knowledge and data engineering, vol. 25, No. 4, pp. 751-763, Apr. 2013 (Year: 2013).*
Van De Geer, S., "Least Squares Estimation," Encyclopedia of Statistics in Behavioral Science, vol. 2 (2005) pp. 1041-1045. (Year: 2005).*
U.S. Office Action issued in U.S. Appl. No. 15/806,841, dated Jul. 10, 2020, pp. 1-39.

* cited by examiner

*Primary Examiner* — Brian M Smith
(74) *Attorney, Agent, or Firm* — Tutunjian & Bitetto, P.C.; Randall Bluestone

(57) ABSTRACT

Similarity of items can be estimated by using a method including generating a prediction model that predicts an indicator of a target based on one or more attributes for items, by estimating a weight set, among weight sets, for each of the items, and estimating a similarity among the items for the target based on the weight sets of the prediction model.

4 Claims, 6 Drawing Sheets

$$x_n \equiv \begin{bmatrix} x_n^{(etc)} \\ x_n^{(1)} \\ x_n^{(2)} \\ \vdots \\ x_n^{(M)} \end{bmatrix} \equiv \begin{bmatrix} x_n^{(etc,1)} \\ x_n^{(etc,2)} \\ \vdots \\ x_n^{(etc,E)} \\ x_n^{(1,1)} \\ x_n^{(1,2)} \\ \vdots \\ x_n^{(1,L)} \\ x_n^{(2,1)} \\ x_n^{(2,2)} \\ \vdots \\ x_n^{(2,L)} \\ \vdots \\ x_n^{(M,1)} \\ x_n^{(M,2)} \\ \vdots \\ x_n^{(M,L)} \end{bmatrix},$$

FIG. 3

$$w \equiv \begin{bmatrix} w^{(etc)} \\ w^{(1)} \\ w^{(2)} \\ \vdots \\ w^{(M)} \end{bmatrix} \equiv \begin{bmatrix} w^{(etc,1)} \\ w^{(etc,2)} \\ \vdots \\ w^{(etc,F)} \\ w^{(1,1)} \\ w^{(1,2)} \\ \vdots \\ w^{(1,C)} \\ w^{(2,1)} \\ w^{(2,2)} \\ \vdots \\ w^{(2,C)} \\ \vdots \\ w^{(M,1)} \\ w^{(M,2)} \\ \vdots \\ w^{(M,C)} \end{bmatrix}$$

FIG. 4

ESTIMATION OF SIMILARITY OF ITEMS

BACKGROUND

Technical Field

The present invention relates to estimation of a similarity of items.

Related Art

In the retail industry, influences from competitive retailers to a target store are often analyzed. It is often necessary to group the competitive retailers due to difficulties of processing every retailer among a huge number of competitive retailers. Similarities among competitive retailers may be used to group the competitive retailers. However, similarities derived from conventional methods may sometimes be irrelevant to the performance of the target store.

SUMMARY

According to a first aspect of the present invention, provided is a method including generating a prediction model that predicts an indicator of a target based on one or more attributes of for each of a plurality of items, by estimating each of a weight set, among a plurality of weight sets, for each of the plurality of items, and estimating a similarity among the plurality of items for the target based on the plurality of weight sets of the prediction model.

The first aspect may also include a computer readable medium storing instructions for causing a processor or programmable circuitry to perform the foregoing method, and an apparatus for performing the foregoing method. The summary clause does not necessarily describe all features of the embodiments of the present invention. Embodiments of the present invention may also include sub-combinations of the features described above.

BRIEF DESCRIPTION OF THE DRAWINGS

FIG. 3 shows $x_n$ according to an embodiment of the present invention.

FIG. 4 shows w according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
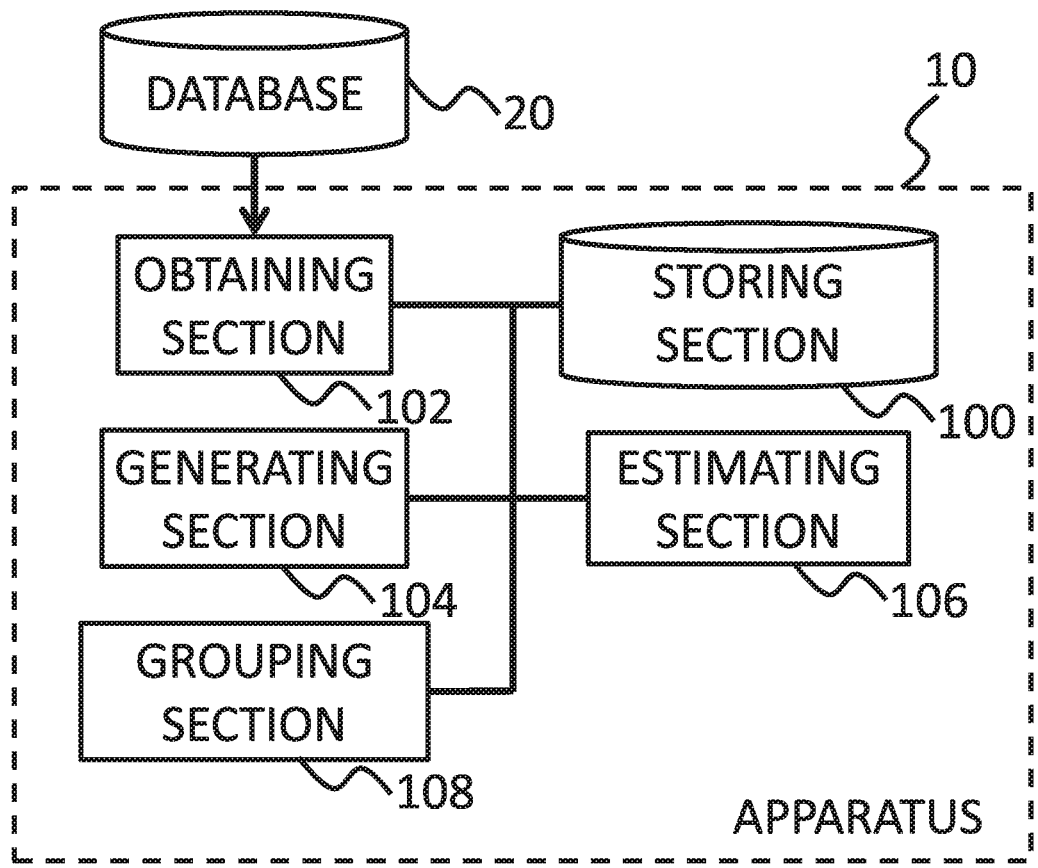
FIG. 1 shows an exemplary configuration of an apparatus, according to an embodiment of the present invention.

FIG. 1 shows an exemplary configuration of an apparatus 10 (e.g., a computer, a programmable circuit, etc.), according to an embodiment of the present invention. The apparatus 10 may obtain an input data including attributes of items and an indicator of a target, and estimate a similarity among items based on the input data.

In an embodiment, the target may be at least one store subject to an analysis (which may hereinafter be referred to as a "target store"), the items may be a plurality of competitive retailers that have store(s) and are competitors of the target store (which may hereinafter be referred to as "competitive retailers"), the indicator of the target is a performance indicator of the target store, and the one or more attributes of the plurality of items are the one or more attributes of the competitive retailers. The store may be brick-and-mortar store, online store, virtual store, etc.

The apparatus 10 may comprise a processor and/or a programmable circuitry and one or more computer program product (e.g., computer readable mediums) collectively including instructions embodied therewith. The instructions, when executed by the processor or programmable circuitry, may cause the processor or the programmable circuitry to operate as a plurality of operating sections. Thereby, the apparatus 10 may be represented as a storing section 100, an obtaining section 102, a generating section 104, an estimating section 106, and a grouping section 108.

The storing section 100 may store a variety of data used for operations of the apparatus 10. The storing section 100 may comprise a volatile or non-volatile memory. One or more other elements in the apparatus 10 (e.g., the obtaining section 102, the generating section 104, the estimating section 106, the grouping section 108, etc.) may communicate data directly or via the storing section 100 as necessary.

The obtaining section 102 may obtain input data comprising one or more data sets. Each of data sets may include the indicator and the one or more attributes of the plurality of items.

In an embodiment, each data set may include a performance indicator of a target store as the indicator, and one or more attributes (e.g., proximity of a store of the competitive retailers to the target store) of each competitive retailer. In an embodiment, each data set may further include one or more attributes for the target store. The obtaining section 102 may obtain the input data from a database 20, which may be equipped inside/outside the apparatus 10.

The generating section 104 may generate a prediction model that predicts an indicator of a target based on one or more attributes of a plurality of items. In an embodiment, the generating section 104 may generate a prediction model that includes a plurality of weight sets for the plurality of items. In the embodiment, the generating section 104 may estimate a weight set, among a plurality of weight sets, for each of the plurality of items. Each of the plurality of weight sets may have one or more weights.

In an embodiment, the generating section 104 may generate the prediction model that further comprises a weight set for the target including one or more weights for the target (which may hereinafter be referred to as "target weights"). In the embodiment, the prediction model may predict the indicator further based on the target weights.

The estimating section 106 may estimate a similarity among the plurality of items for the target based on the prediction model generated by the generating section 104. In an embodiment, the estimating section 106 may estimate the similarity based on the plurality of weight sets of the prediction model.

The grouping section 108 may group the plurality of items into two or more groups based on the similarity among the plurality of items estimated by the estimating section 106.

As explained in relation to the embodiments of FIG. 1, the apparatus 10 may generate the prediction model that has a plurality of weight sets corresponding to the target and the plurality of items and that predicts the indicator of the target from the attributes of the plurality of items.

According to the embodiments, the apparatus may estimate the similarity among items based on how the attributes of the items influence the target, instead of the attributes of the items themselves.

Figure 2:
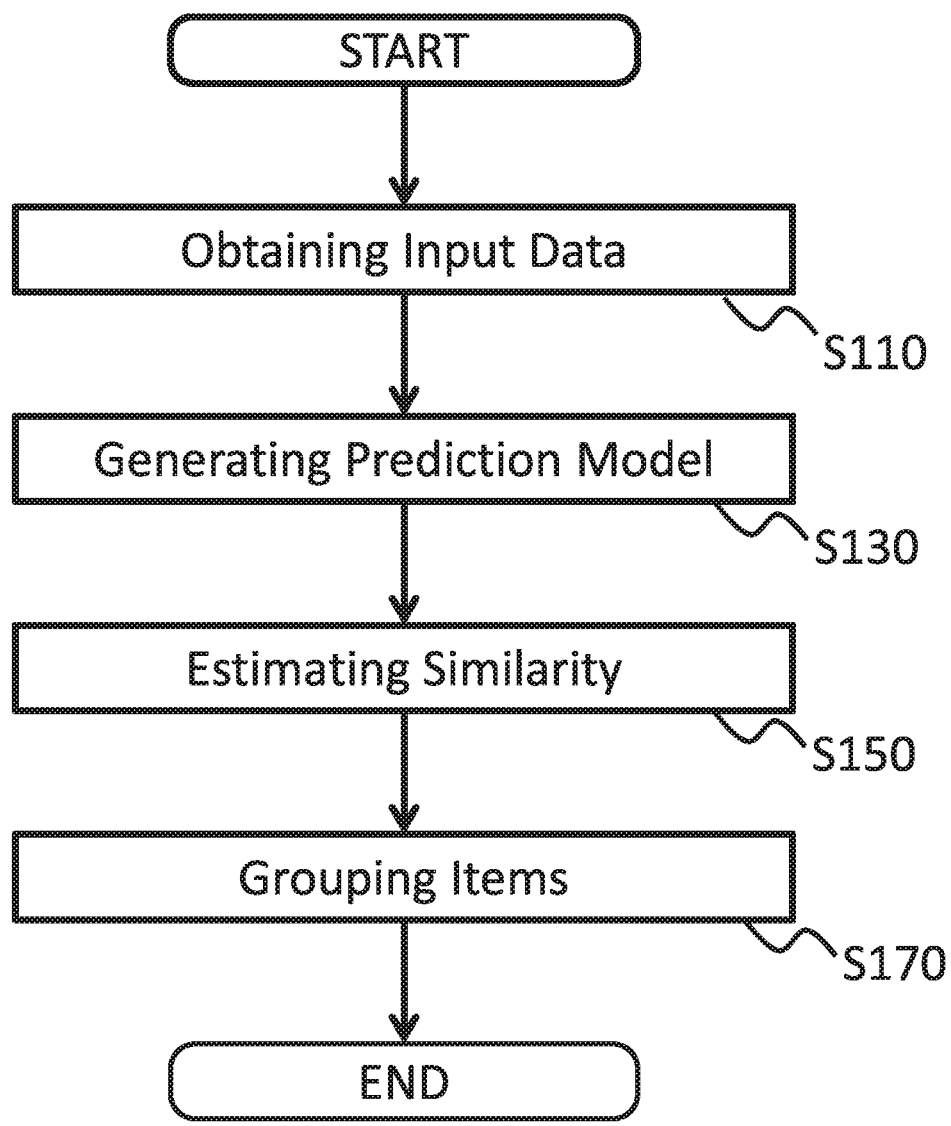
FIG. 2 shows an operational flow according to some embodiments of the present invention.

FIG. 2 shows an operational flow according to some embodiments of the present invention. The present embodiment describes an example in which an apparatus, such as the apparatus 10, performs the operations from S110 to S170, as shown in FIG. 2. The apparatus may estimate the similarity of items for the target and may group the items by performing the operations of S110-S170.

At S110, an obtaining section such as the obtaining section 102 may obtain an input data comprising one or more data sets from a database such as the database 20.

In an embodiment, the obtaining section may obtain the input data D, which can be represented as $D \equiv \{(x_1, y_1), (x_2, y_2), \ldots, (x_N, y_N)\}$, where N is the number of the data sets. $x_n (1 \leq n \leq N)$ may be a vector including one or more attributes for the target and M attribute sets for M items in an n-th data set (i.e., the n-th sample).

FIG. 3 shows $x_n$ according to an embodiment of the present invention. In an embodiment of FIG. 3, $x_n$ is represented as $x_n \equiv (x^{(etc)}_n, x^{(1)}_n, x^{(2)}_n, \ldots x^{(M)}_n)$. $x^{(etc)}_n$ may be one or more attributes for the target in $x_n$, and represented as $x^{(etc)}_n \equiv (x^{(etc,1)}_n, x^{(etc,2)}_n, x^{(etc, E)}_n)$, where E is an integer equal to or larger than 1. An e-th ($1 \leq e \leq E$) element $x^{(etc,e)}_n$ in $x^{(etc)}_n$ may be the e-th attribute of the target in the n-th data set.

In an embodiment, the target (i.e., the target store) may represent at least one store among a group of stores. For example, the target store may represent a store among the stores of a retailer. In the embodiment, the stores of the retailer may be franchised stores of a specific brand, stores owned by a company or group of companies, etc.

In the embodiment, $x^{(etc)}_n$ may be one or more attributes of an $s_n$-th store $s_n$ among stores of the franchise chain X. In other words, the target store $s_n$ may be different for each data set in N data sets. For example, the target store $s_n$ in n-th data set and the target store $s_{n+1}$ in (n+1)-th data set may be different.

In an alternative embodiment, the target may represent the same store for N data sets at different times. For example, the target store $s_n$ in the n-th data set and the target store $s_{n+1}$ in (n+1)-th data set may be the same store at different times (e.g., different years, months, weeks, days, hours, etc.)

The attributes $x^{etc}_n$ (i.e., $x^{(etc,1)}_n, x^{(etc,2)}_n \ldots x^{(etc,E)}_n$) of the target store $s_n$ may be values representing characteristics of the target store (e.g., a location, a size, a franchise, a climate, a business category, and/or other characteristics of the store $s_n$).

An m-th element $x^{(m)}_n$ in $x_n$ may be a scholar or a vector representing attribute(s) of an m-th item ($1 \leq m \leq M$) and represented as $x^{(m)}_n \equiv (x^{(m,1)}_n, x^{(m,2)}_n, \ldots, x^{(m,L)}_n)$ where L is an integer equal to or larger than 1. An l-th ($1 \leq l \leq L$) element $x^{(m,l)}_n$ in $x^{(m)}_n$ may be an l-th attribute of the m-th item in the n-th data set.

In an embodiment, each of the plurality of items may represent a group of stores (e.g., franchised stores of a specific brand, stores owned by a company or group of companies, etc). For example, a first item may represent stores of a franchise chain 1, a second item may represent stores of a franchise chain 2, . . . , an M-th item may represent stores of a franchise chain M.

In an embodiment, the attributes of the m-th item ($x^{(m,1)}_n, x^{(m,2)}_n, \ldots, x^{(m,L)}_n$) may be attributes of at least a part of stores of the m-th item. In a specific embodiment, $x^{(m,l)}_n, x^{(m,2)}_n, \ldots, x^{(m,L)}_n$ may be attributes of one or more stores (which may be referred to as "$c_{m,n}$") of the franchise chain m that is closest to the target store $s_n$ in the n-th data set. In an embodiment, the attributes of the one or more stores of the franchise chain may be a proximity (or distance) from the closest store(s) $c_{m,n}$ to the target store $s_n$, a scale of the closest store(s) $c_{m,n}$, sales of the closest store(s) $c_{m,n}$, a business category of the closest store(s) $c_{m,n}$, etc.

$y_n$ is the indicator of the target store $s_n$ in the n-th data set. In an embodiment, $y_n$ is a performance indicator (such as Key Performance Indicator: KPI) of the target store $s_n$. In the embodiment, the KPI of the target store $s_n$ may be an amount of sales of $s_n$, business profit of $s_n$, gross profit of $s_n$, percentage of profit of $s_n$, inventory turnover of $s_n$, other management indicator(s) of $s_n$, or a combination of two or more of those indicators.

In an embodiment, $x_1$ includes the attributes of a target store $s_1$ at a first time $t_1$ in a first data set and the attributes of stores ($c_{1,1}, c_{2,1}, \ldots, c_{M,1}$) of each item closest to the target store $s_1$ while $y_1$ is an indicator of the target store $s_1$ a first time $t_1$, $x_2$ includes the attributes of a target store $s_2$ at a second time $t_2$ in a second data set and the attributes of stores ($c_{1,2}, c_{2,2}, \ldots, c_{M,2}$) of each item closest to the target store $s_2$ while $y_2$ is an indicator of the target store $s_2$ a second time $t_2, \ldots, x_N$ includes the attributes of a target store $s_N$ at an N-th time $t_N$ in the N-th data set and the attributes of stores ($c_{1,N}, c_{2,N}, \ldots, c_{M,N}$) of each item closest to the target store $s_N$ while $y_N$ is an indicator of the target store $s_N$ at the N-th time $t_N$. In the embodiment, $t_1, t_2, \ldots, t_N$ and/or $s_1, s_2, \ldots, s_N$ may be same, partially the same, and/or totally different.

At S130, a generating section such as the generating section 104 may generate a prediction model that predicts an indicator of the target based on the one or more attributes of both the target and the plurality of items in the input data D obtained at S110. The generating section may generate the prediction model represented as $\hat{y}_n = h(x_n, w)$ by estimating w so as to minimize a total error of the indicator $y_n$ and an estimated indicator $\hat{y}_n$ for N data sets in the input data D. In an embodiment, the prediction model may be a linear regression model or a perceptron model, and may be represented as $h(x_n, w) = w^T x_n$.

FIG. 4 shows w according to an embodiment of the present invention. In an embodiment of FIG. 4, the generating section may estimate a vector w including a plurality of weight sets for the target and the plurality of items.

As shown in FIG. 4, w is represented as $w \equiv (w^{(etc)}, w^{(1)}, w^{(2)}, \ldots, w^{(M)})$. $w^{(etc)}$ may be a weight set for the target (i.e., target weights) and may include one or more weights $w^{(etc,1)}, w^{(etc,2)}, \ldots, w^{(etc,F)}$. F is the number of weights for the target. F may be equal to or larger than 1. F may or may not be the same as E, which is the number of the attributes of the target.

The vector w also includes M weight sets for M items. $w^{(m)}$ is a weight set for an m-th item (m=1, 2, ..., M), and may include one or more weights $w^{(m,1)}, w^{(m,2)}, \ldots w^{(m, C)}$ of the m-th item. C is the number of weights for the items. C may be equal to or larger than 1. C may or may not be the same as L, which is the number of the attributes of the target store $s_n$.

The generating section may estimate w for N data sets in the input data. In an embodiment, the generating section may estimate a posterior probability distribution of each of the plurality of weight sets ($w^{(etc)}, w^{(1)}, w^{(2)}, \ldots w^{(M)}$) by using the input data D as an observation based on a Bayesian inference. In an embodiment, assuming that the input data and w as random variables, the posterior probability distribution p(w/D) is represented as formula (1):

$$p(w|D) = \prod_{n=1}^{N} \frac{l_h(y_n|x_n, w) p_h(w|x_n)}{Pr(Y_n = y_n | X_n = x_n)}, \quad (1)$$

where $l_h(y_n|x_n, w)$ is a likelihood function of w and defined as $l_h(y_n|x_n, w)=Pr(Y=y_n|Y^\wedge=h(x_n, w))$, $p_h(w|x_n)$ is a prior distribution of w and defined as $p_h(w|x_n)=Pr(w=w|X_n=x_n)$ (or $p_h(w|x_n)=p_h(w)=Pr(W=r)$).

In a first embodiment, the generating section may use Gaussian distribution as a prior probability distribution of the plurality of weight sets. In the first embodiment, the generating section may analytically estimate p(w|D) by presuming that the prior distribution $p_h(w|x_n)$ is $N(w|0, \alpha^{-1}I_C)$ and that the likelihood function $l_h(y_n|x_n, w)$ is $N(y_n|h(x_n, w) \beta^{-1})$ where $N(x|\mu,\Sigma)$ is a Gaussian distribution of x having mean $\mu$ and variance $\Sigma$, $\alpha$ and $\beta$ are hyper-parameters, and $I_C$ is the identity matrix of size C. In an example of the first embodiment, the generating section may initially determine the hyperparameters including $\alpha$ and $\beta$ with a cross-validation method. In the example, the Gaussian distribution $N(x|\mu,\Sigma)$ may be defined by the following formula (2):

$$N(x|\mu, \Sigma) \equiv \frac{1}{\sqrt{2^d \pi^d \det|\Sigma|}} \exp\left(-\frac{1}{2}(x-\mu)^T \Sigma^{-1}(x-\mu)\right). \quad (2)$$

In an example of the first embodiment, the generating section may perform the estimation of the posterior probability distribution of weight w by calculating a posterior probability distribution p(w/D) shown in the following formula (3):

$$p(w|D)=N(w|m_D, S_D) \quad (3),$$

where $m_D$ is a vector derived from (a) $S_D$, (b) a sum of multiplication of $x_n$ and (c) $y_n$ for n=1, ..., N, where $S_D$ is a matrix derived from a sum of multiplication of $x_n^T$ and $x_n$ for n=1, ..., N.

In an example of the first embodiment, $m_D$ and $S_D$ are represented as shown in the following formulae (4)-(5):

$$m_D = S_D^{-1} \sum_{n=1}^{N} y_n x_n \equiv \begin{bmatrix} m^{(etc)} \\ m_D^{(1)} \\ \vdots \\ m_D^{(M)} \end{bmatrix} \equiv m_D^{\{etc,1,\ldots,M\}}, \quad (4)$$

$$S_D^{-1} = \alpha I + \beta \sum_{n=1}^{N} x_n^T x_n \equiv \begin{bmatrix} S_D^{(etc,etc)} & S_D^{(etc,1)} & \ldots & S_D^{(etc,M)} \\ S_D^{(1,etc)} & S_D^{(1,1)} & \ldots & S_D^{(1,M)} \\ \vdots & \vdots & \ddots & \vdots \\ S_D^{(M,etc)} & S_D^{(M,1)} & \ldots & S_D^{(M,M)} \end{bmatrix}^{-1} \equiv (S_D^{\{etc,1,\ldots,M\}})^{-1}, \quad (5)$$

where $S_D^{(etc,etc)}$ is a matrix derived from $x^{(etc)}_n$, $S_D^{(m, etc)}$ $S_D^{(etc, m)}$ are matrices derived from $x^{(m)}_n$ and $x^{(etc)}_n$, and $S_D^{(m,m)}$ is a matrix derived from $x^{(m)}_n$ and $x^{(m)}_n$. Formula (5) shows an inverse matrix $S_D^{-1}$ of the matrix $S_D$. The generating section may calculate $S_D$ from $S_D^{-1}$ defined in formula (5).

According to the examples of the first embodiments utilizing the formulae (4)-(5), the generating section may estimate parameters, such as $m_D$ and $S_D$, relating to the distribution of the plurality of weight sets as the plurality of weight sets of the prediction model, rather than estimating the plurality of weights sets themselves at S130.

In a second embodiment alternative to the first embodiment, the generating section may estimate p(w|D) by known sampling algorithms such as Markov Chain Monte Carlo (MCMC) method instead of the analytical estimation. In the second embodiment, the generating section may or may not adopt a distribution other than a Gaussian distribution for the prior distribution $p_h(w|x_n)$ and/or the likelihood function $l_h(y_n|x_n, w)$.

At S150, an estimating section, such as the estimating section 106, may estimate a similarity among the plurality of items for the target based on the prediction model generated at S130. The similarity among the plurality of items for the target may be the similarity of the items in perspective of the target, and may not be the similarity of the attributes of the plurality of items. The estimating section may estimate this similarity by utilizing the distribution of the plurality of weight sets for the plurality of items.

In an embodiment, the estimating section may estimate a similarity between two items of the plurality of items by estimating a similarity between a weight set for an item and a weight set for the other item. In one embodiment, the estimating section may estimate a similarity between distribution of a weight set for an item and a distribution of a weight set for the other item. In the other embodiment, the estimating section may estimate a similarity between representative value(s) (e.g., mean value(s) or median value(s)) in distribution of a weight set for an item and the representative value(s) of a distribution of a weight set for the other item.

In an embodiment, the estimating section may estimate the similarity between two items based on a distance between the two weight sets of the two items. In an embodiment, the estimating section may marginalize out w from a similarity function. In the embodiment, the estimating section may calculate the similarity s(i, j) of an item i and an item j by the following formula (6):

$$s(i,j)=\int_w f(w^{(i)}, w^{(j)}) p(w|D) dw \quad (6),$$

where $f(w^{(i)}, w^{(j)})$ is the similarity function providing the similarity (e.g., proximity or distance) between the two weight sets of the item i and the item j.

In an embodiment, the estimating section may estimate the similarity between the two weight sets of the two items based on at least one of a square distance, a Gaussian similarity, a normalized inner product similarity, and a cosine similarity between the two weight sets of the two items.

In the embodiment, $f(w(i), w(j))$ may be represented by one of following formulae (7)-(10):

$$f(w^{(i)}, w^{(j)}) := \|w^{(i)} - w^{(j)}\|_2^2 \quad (7),$$

$$f(w^{(i)}, w^{(j)};\gamma) := \exp(-\gamma \|w^{(i)} - w^{(j)}\|_2^2) \quad (8),$$

where $\gamma$ is a hyper parameter that may be determined by the scale of w or be set to 1, $$f(w^{(i)}, w^{(j)}; \overline{w^{(i)}}, \overline{w^{(j)}}) := \frac{w^{(i)T} w^{(j)}}{\|\overline{w^{(i)}}\|_2 \|\overline{w^{(j)}}\|_2}, \quad (9)$$

where a recommended instance of $\overline{w^{(i)}}$ is a maximum a posteriori probability (MAP) estimate of $w(i)$ or set to 1, $$f(w^{(i)}, w^{(j)}) := \frac{w^{(i)T} w^{(j)}}{\|w^{(i)}\|_2 \|w^{(j)}\|_2}, \quad (10)$$

where the number of dimensions of $w^{(i)}$ is more than 1 because the similarity is always 1 when D=1.

The formula (7) may correspond to the squared distance, the formula (8) may correspond to the Gaussian similarity, the formula (9) may correspond to the normalized inner product similarity, and the formula (10) may correspond to the cosine similarity.

In an embodiment, the estimating section may estimate the similarity between the item i and the item j based on the square distance by calculating a formula (11):

$$s(i,j) = \|m_D^{(i)} - m_D^{(j)}\|_2^2 + \text{trace}(S_D^{(i,i)}) + \text{trace}(S_D^{(j,j)}) - 2\text{trace}(S_D^{(i,j)}) \quad (11),$$

where $1 \le i, j \le M$.

In an embodiment, the estimating section may estimate the similarity between an item i and an item j based on the Gaussian similarity by calculating a formula (12):

$$s(i, j) = \quad (12)$$

$$\frac{\det(S_D^{\{i,j\}})^{-1}}{\det((S_D^{\{i,j\}})^{-1} + \beta \tilde{I})} \exp\left(-\frac{\beta}{2} m_D^{\{i,j\}T}\left(\tilde{I} - \tilde{I}((S_D^{\{i,j\}})^{-1} + \beta \tilde{I})^{-1} \tilde{I}\right) m_D^{\{i,j\}}\right),$$

where $$1 \le i, j \le M, \tilde{I} \equiv \begin{bmatrix} I_C & -I_C \\ -I_C & I_C \end{bmatrix}, m^{\{i,j\}}_D$$

is a vector of size 2C made by concatenation of a vector $m^i_D$ and a vector $m^j_D$, $S^{\{i,j\}}_D$ is a matrix of size 2C×2C defined as $$S_D^{\{i,j\}} \equiv \begin{bmatrix} S_D^{(i,i)} & S_D^{(i,j)} \\ S_D^{(j,i)} & S_D^{(j,j)} \end{bmatrix} \cdot m^{\{i,j\}}_D$$

may correspond to a central vector of posterior probability distribution of $w^{\{i,j\}}$ made by concatenation of $w^i$ and $w^j$, and $S^{\{i,j\}}_D$ may correspond to covariance matrix of posterior probability distribution of $w^{\{i,j\}}$.

In an embodiment, the estimating section may estimate the similarity between an item i and an item j based on the normalized inner product similarity by calculating a formula (13):

$$s(i, j) = \frac{m_D^{(i)T} m_D^{(j)} + \text{trace}(S_D^{(i,j)})}{\|\overline{w^{(i)}}\|_2 \|\overline{w^{(j)}}\|_2}, \quad (13)$$

where $1 \le i, j \le M$, where $\overline{w^{(i)}}$ is set to the mean of $w^{(i)}$ (i.e., $\int_w w^{(i)} p(w|D) dw$) or the maximum of an a posteriori of $w(i)$ (e.g., $\text{argmax}_{w^{(i)}} p(w^{(i)}|D)$), $\overline{w^{(i)}}$ is $m_D^{(i)}$ and the formula (13) is transformed to a formula (14):

$$s(i, j) = \frac{m_D^{(i)T} m_D^{(j)} + \text{trace}(S_D^{(i,j)})}{\|m_D^{(i)}\|_2 \|m_D^{(j)}\|_2}. \quad (14)$$

In the foregoing embodiments, the estimating section may calculate at least one of the formulae (11)-(14) by utilizing $m_D$ and $S_D$ estimated at S130 as the similarity between the items i, j at S150. In other embodiments, the estimating section may calculate the formula (6) by a more naïve approach without $m_D$ and $S_D$.

In an embodiment, the estimating section may calculate similarities of all or some of the possible pairs of items made from the plurality of items.

At S170, a grouping section, such as the grouping section 108, may group the plurality of items into two or more groups based on the similarity among the plurality of items estimated at S150. The grouping section may perform grouping of the items based on known similarity-based classification methods.

In an embodiment, the grouping section may perform the grouping such that every item in one group has at least a threshold similarity with all other items in the one group. In an embodiment, the grouping section may perform the grouping such that every item in one group has at least a threshold similarity with at least one of all other items in the one group. In an embodiment, the grouping section may output a result of the grouping on a display of the apparatus.

According to the foregoing embodiments, the apparatus may generate a prediction model that has stochastically distributed weights, and estimate the similarity of the items based on the stochastically distributed weights of each item. Thereby, the apparatus may accurately perform the grouping of the items in perspective of the target with less computational resources.

Figure 5:
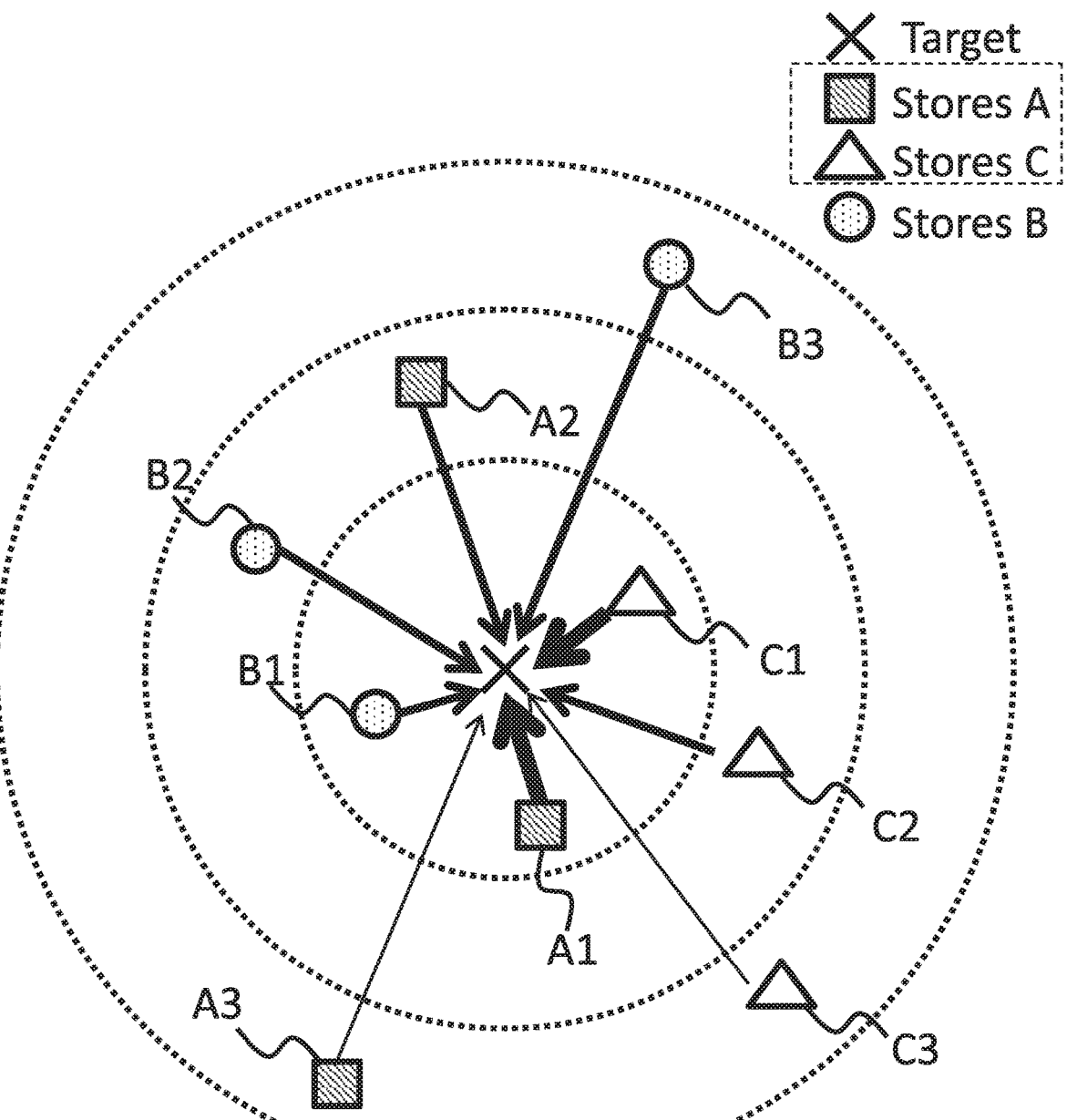
FIG. 5 shows an illustrative similarity model according to an embodiment of the present invention.

FIG. 5 shows an illustrative similarity model displayed (e.g., on a display device) according to an embodiment of the present invention. The display device can display an indicator (performance) and one or more attributes of a plurality of similar items.

In an embodiment, FIG. 5 indicates stores and their locations. In the embodiment of FIG. 5, a target store is located in a center and shown as "X."

Stores of the competitive retailers are represented by squares, circles, and triangles in FIG. 5. In the embodiment, three items represent the competitive retailers The first item may correspond to Stores A (shown as squares in FIG. 5), the second item may correspond to Stores B (shown as circles), and the third item may correspond to Stores C (shown as triangles). For example, Stores A, B, and C may each represent franchised stores.

Stores A include a store A1 (nearest to the target store among stores A), a store A2 (second nearest to the target store among stores A), and a store A3 (farthermost to the target store among stores A). Stores B include a store B1 (nearest to the target store among stores B), a store B2 (second nearest to the target store among stores B), and a store C3 (farthermost to the target store among stores B). Store C includes a store C1 (nearest to the target store among stores C), a store C2 (second nearest to the target store among stores C), and a store C3 (farthermost to the target store among stores C).

In FIG. 5, line weights of arrow lines from each store to the target store may show a degree of influence to which the attributes of each store give an indicator of the target store. For example, FIG. 5 shows that the store A1 and the store C1 may strongly influence the indicator of the target store, while the store A3 and the store C3 may have little influence on the indicator.

According to the embodiment, Stores A and Stores C may have in common that an amount of influence to the target store is proportional to the proximity to the target store. Meanwhile, the influence of Stores C to the target store is irrelevant to the proximity. A weight set of an item may represent how attributes of the item influences an indicator of a target.

Therefore, in cases in which the plurality of attributes of the items (i.e., $x^{(m)}_n$) includes values related to proximity (or distance) to the target store from the nearest store of each item, a weight set for Stores A (e.g., $w^{(A)}$) and a weight set for Stores C (e.g., $w^{(C)}$) may be similar. Thereby, the grouping section may group an item representing Stores A and an item representing Stores C into a single group.

As explained in relation to the foregoing embodiments, the apparatus may group a plurality of items based on the way the attributes of the items affect the indicator of the target, rather than the attributes of the items themselves. Therefore, the apparatus may categorize the items in terms of an impact to the target with less computational resources. In particular, for cases in which the number of samples (e.g., N) is small (e.g., N<E+LM) and there is collinearity between the attributes of the items, a naïve approach may not estimate the correct similarity among the items.

Although embodiments where the target and the plurality of items may be stores are mainly described, various other implementations are also possible. Any other embodiments where an indicator of the target is estimated by a prediction model with weights from attributes of the plurality of items are possible. For example, embodiments where the target is a person, the items are actions/events of the person, and the indicator is a result of the actions/events may be realized based on the foregoing explanation.

Figure 6:
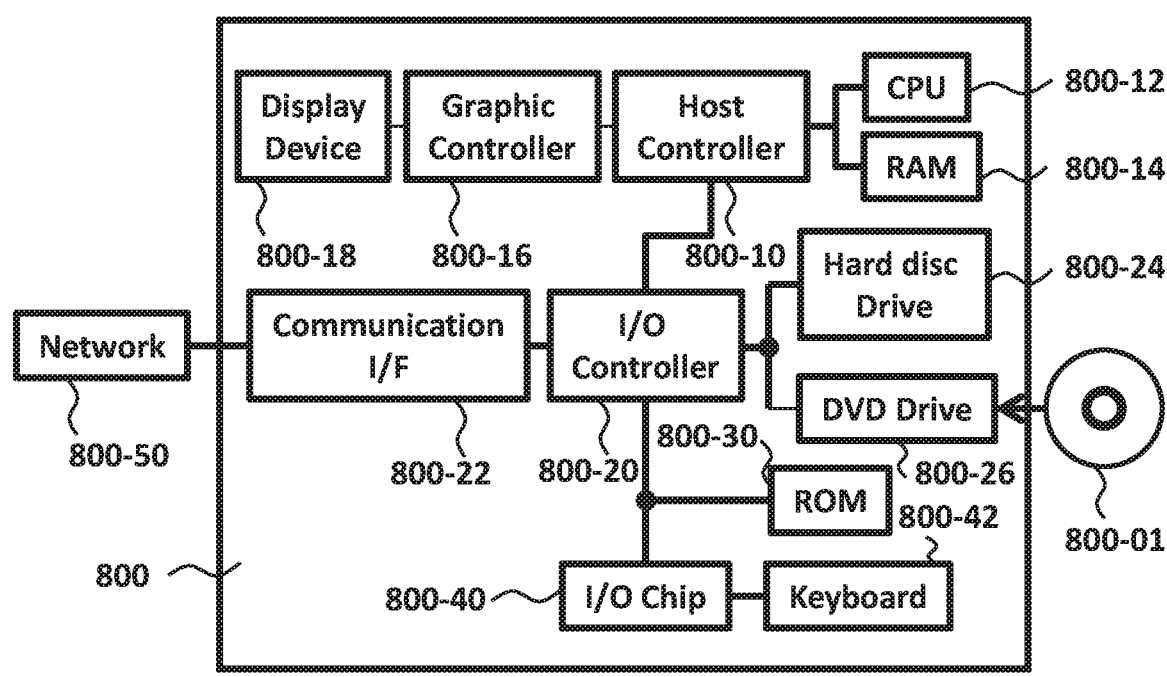
FIG. 6 shows an exemplary hardware configuration of a computer that functions as a system, according to an embodiment of the present invention.

FIG. 6 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/ replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. A non-transitory computer program product having instructions embodied therewith, the instructions executable by a processor or programmable circuitry to cause the processor or programmable circuitry to perform operations comprising:
generating a prediction model that predicts an indicator of a target based on one or more attributes of each of a plurality of items, by estimating a weight set having a plurality of weights, among a plurality of weight sets, each of the one or more attributes are values representing characteristics of the target;
estimating a similarity among the plurality of items for the target based on the plurality of weight sets of the prediction model, the similarity derived at least from distances between one or more of the plurality of weight sets;
grouping the plurality of items into two or more groups based on the similarity derived from the distances between the one or more of the plurality of weight sets; and
displaying on a display device an illustrative diagram having a representation of the indicator and the one or more attributes of the plurality of items in accordance with the similarity,
wherein the generating of the prediction model includes estimating a posterior probability distribution of each of the plurality of weight sets, and
wherein the estimating of the posterior probability distribution of the plurality of weight sets is performed by calculating the posterior probability distribution p(w/D) according to:

$$p(w|D)=N(w|m_D,S_D),$$

where $D \equiv \{(x_1, y_1), (x_2, y_2) \ldots (x_N, y_N)\}$, N is a number of the one or more data sets, $x_n$ ($1 \leq n \leq N$) is a vector including the one or more attributes for the target and M attribute sets for M items in an n-th data set, $y_n$ is the indicator of the target in the n-th data set, w is a vector including the one or more weights for the target and M weight sets for M items, $m_D$ is a vector derived from $S_D$, a sum of multiplication of $x_n$ and $y_n$ for n=1, . . . ,N, and $S_D$ is a matrix derived from a sum of multiplication of $x_n^T$ and $x_n$ for n=1, . . . , N.

2. The non-transitory computer program product according to claim 1, wherein the generating of the prediction model includes estimating one or more weights for the target, wherein the prediction model predicts the indicator of the target further based on the one or more weights for the target.

3. An apparatus comprising:
a processor; and
one or more computer readable mediums collectively including instructions that, when executed by the processor, cause the processor to perform operations including:
generating a prediction model that predicts an indicator of a target based on one or more attributes of each of a plurality of items, by estimating a weight set having a plurality of weights, among a plurality of weight sets, each of the one or more attributes are values representing characteristics of the target,
estimating a similarity among the plurality of items for the target based on the plurality of weight sets of the prediction model, the similarity derived at least from distances between one or more of the plurality of weight sets;
grouping the plurality of items into two or more groups based on the similarity derived from the distances between the one or more of the plurality of weight sets; and
displaying on a display device an illustrative diagram having a representation of the indicator and the one or more attributes of the plurality of items in accordance with the similarity,
wherein the generating of the prediction model includes estimating a posterior probability distribution of each of the plurality of weight sets, and
wherein the estimating of the posterior probability distribution of the plurality of weight sets is performed by calculating the posterior probability distribution p(w/D) according to:

$$p(w|D)=N(w|m_D,S_D),$$

where $D \equiv \{(x_1, y_1), (x_2, y_2) \ldots (x_N, y_N)\}$, N is a number of the one or more data sets, $x_n$ ($1 \leq n \leq N$) is a vector including the one or more attributes for the target and M attribute sets for M items in an n-th data set, $y_n$ is the indicator of the target in the n-th data set, w is a vector including the one or more weights for the target and M weight sets for M items, $m_D$ is a vector derived from $S_D$, a sum of multiplication of $x_n$ and $y_n$ for n=1, . . . ,N, and $S_D$ is a matrix derived from a sum of multiplication of $x_n^T$ and $x_n$ for n=1, . . . , N.

4. The apparatus according to claim 3, wherein the generating of the prediction model includes estimating one or more weights for the target, wherein the prediction model predicts the indicator of the target further based on the one or more weights for the target.

* * * * *